United States Patent [19]
McKenna et al.

[11] Patent Number: 5,473,602
[45] Date of Patent: Dec. 5, 1995

[54] WIRELESS RADIO PACKET SWITCHING NETWORK

[75] Inventors: Daniel B. McKenna, Broomfield; Kenneth J. Jochim, Boulder; Donald N. Shepard, Lafayette; Kevin B. Bradway, Longmont, all of Colo.

[73] Assignee: Nova-Net Communications, Inc., Broomfield, Colo.

[21] Appl. No.: 207,015

[22] Filed: Mar. 4, 1994

[51] Int. Cl.[6] .............................. H04B 7/14; H04L 12/56
[52] U.S. Cl. .......................... 370/60; 370/94.3; 370/95.1; 379/59; 455/33.4
[58] Field of Search .................. 370/94.1, 94.3, 370/97, 95.1, 95.3, 60, 60.1, 85.13; 379/58, 59, 60; 455/33.1, 33.2, 33.4, 34.1, 34.2, 53.1, 54.1, 56.1; 340/825.02

[56] References Cited

U.S. PATENT DOCUMENTS

| | | | |
|---|---|---|---|
| 4,999,833 | 3/1991 | Lee | 370/94.3 |
| 5,295,154 | 3/1994 | Meier et al. | 370/95.1 |
| 5,359,603 | 10/1994 | McTiffin | 370/95.1 |

*Primary Examiner*—Alpus Hsu
*Attorney, Agent, or Firm*—Duft, Graziano & Forest

[57] ABSTRACT

The method and apparatus of the present invention converts a geographically dispersed collection of transceivers into an organized packet switched network with greater utilization of each transceiver and a significant reduction in the number of central control sites as well as the elimination of a substantial number of the ground-based communication links between central control sites and their hierarchically senior data collection elements. This is accomplished by the implementation of virtual waveguides that represent deterministic data communication highways through the plurality of radio transceivers to transmit data from various sources to identified destinations.

29 Claims, 5 Drawing Sheets

| START OF PACKET (SOP) | NETWORK HEADER | VWG HEADER | DIAGNOSTIC HEADER | DATA/COMMAND BLOCK LENGTH ↘ DATA/COMMAND BLOCK | CRC | END OF PACKET (EOP) |
|---|---|---|---|---|---|---|
| 4 BITS | 74 BITS | 22 TO 394 BITS | 1 TO 80 BITS | 9 BITS    UP TO 512 BYTES IN INTEGER INCREMENTS | 16 BITS | 4 BITS |

FIG. 4

| CUST ID | H | N | S | D1 | D2 | Dsub | Dset | DRD | PORT ID | L3 ack | L2 ack | NEW VWG | VWG NODE ADDR | DATA OR CMD | PCKT ORDER | PCKT PRIOR | M-BIT | UMI | BCST MODE |
|---|---|---|---|---|---|---|---|---|---|---|---|---|---|---|---|---|---|---|---|
| 29 BITS | 10 BITS | 5 BITS | 10 BITS | 10 BITS | 10 BITS | 2 BITS | 1 BIT | 2 BITS | 2 BITS | 1 BIT | 1 BIT | 1 BIT | 10 BITS | 1 BIT | 4 BITS | 2 BITS | 1 BIT | 5 BITS | 2 BITS |

FIG. 5

WIRELESS RADIO PACKET SWITCHING NETWORK

FIELD OF THE INVENTION

This invention relates to radio transceivers and a method and apparatus for interconnecting a plurality of these radio transceivers into a packet switching network for data transmission purposes.

PROBLEM

It is a problem in the field of radio telemetry that the telemetry systems have a minimal data communication capacity. In particular, radio telemetry is used in many applications, such as remote control of equipment or unattended equipment site polling for data collection purposes. These existing systems are extremely simplistic in their design in that a central control station transmits data to and receives data from a number of satellite locations to perform the required data communication function. It is obvious that these telemetry stations are little utilized and must be within a short distance of the central transceiver that communicates with all of the plurality of transceiver sites in its particular area. There is therefore a multiplication of central transceivers due to the limited range of communication capability, which range can be severely impacted by adverse topological conditions. The cost to implement this system is significant because each transceiver performs a very minimal function and is little utilized. Furthermore, each central transceiver is linked by expensive land line facilities to data collection centers, which exacerbates the implementation cost problem.

SOLUTION

The above-described problems are solved and a technical advance achieved in the field by the wireless radio packet switching network of the present invention. The method and apparatus of the present invention creates an adaptive self-routing packet switching network using the radio transceivers of telemetry systems without the need for extensive routing tables or complicated central control apparatus. This is accomplished by defining virtual waveguides that route information through a plurality of radio transceiver nodes from a source to a selected destination. These virtual waveguides are defined to constrain the path that the information takes through the network and to thereby ensure that the message can reliably be communicated to the destination with minimal probability of blocking. The virtual waveguide is a multi-dimensional element and is not constrained to simply a nodal path definition but can include polarization, frequency of transmission or other variables that are within the capability of the particular radio transceivers that are used to implement the network. Furthermore, alternate virtual waveguides can be defined as back-up transmission paths to increase the probability that the message reaches the destination on the selected path. Again, these alternate virtual waveguides are multi-dimensional elements and can be specified at the source or dynamically defined as the message is routed through the originally selected virtual waveguide. In either case, the omnidirectional radio transceivers installed at multiple sites over a diverse geographic area are interconnected by the virtual waveguides into well-defined and constrained communication paths which enable the transceiver elements to be used as network communication nodes rather than simple telemetry elements. Furthermore, the artifact of the virtual waveguide simplifies the message routing in the network and avoids the necessity of using complicated routing tables, control algorithms or encountering a high probability of message blocking.

BRIEF DESCRIPTION OF THE DRAWING

FIGS. 4–6 illustrate the radio packet structure, network header and virtual waveguide header, respectively;

DETAILED DESCRIPTION

Figure 3A:
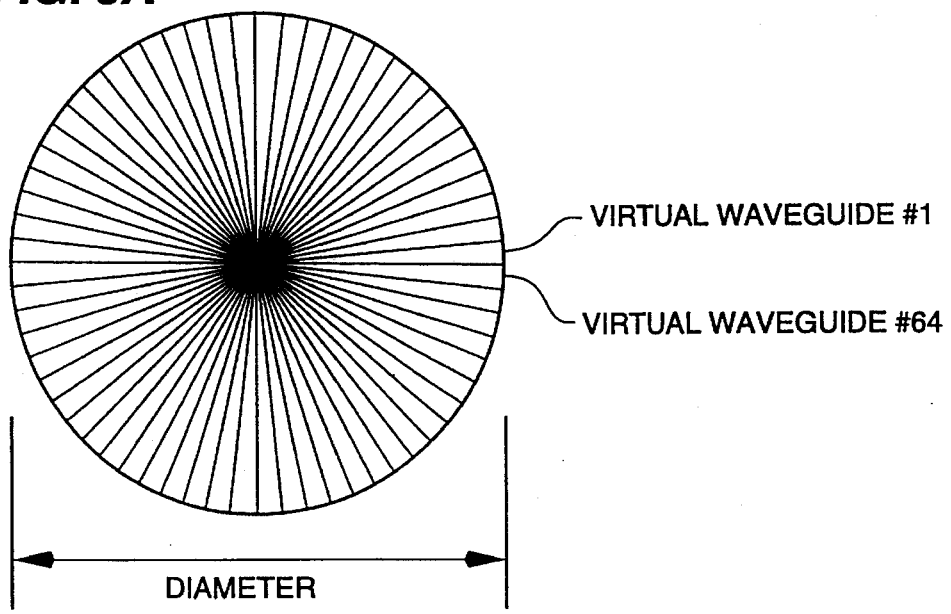
FIGS. 3a and 3b illustrate a star network configuration.
Figure 3B:
Figure 6:
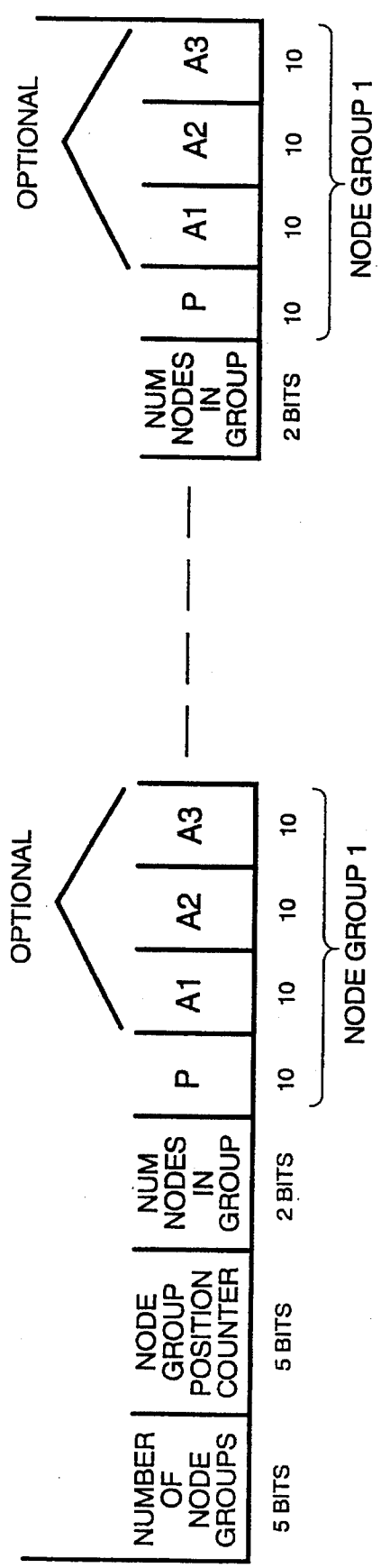

Radio transceivers are in use in many diverse applications. These devices are typically used to control remotely-located apparatus or to monitor the operation of equipment at a predetermined site and communicate the status of this equipment to a central control location on a periodic polled basis, or on a report by exception basis. For the purpose of this description, a polled system is disclosed although the features of this system can be incorporated into other operational configurations. In a polled system application wherein a plurality of local transceivers vector on a central transceiver, such as a star topology shown in FIGS. 3a and 3b, a central transceiver must communicate with the various site transceivers, performing the polls and collecting the data on a scheduled basis. The spacing and number of transceivers for each central control location is a function of the topography of the area in which the transceivers are located. Since a plurality of these transceiver sites vector on a single central control site, the cost-effectiveness of each central control site is determined by the regional topography. Since these transceivers operate on a line of sight basis, in many cases only a few transceiver sites are within the range of communication of a single central control site. Furthermore, the transceivers in even the best of conditions remain idle most of the time since the periodic polling is infrequent at best.

Examples of the application of this technology to spatially diverse sites can be found in oil field monitoring applications, railway signals and switch control as well as pipeline pumping station monitoring applications. This technology can also be used in three-dimensional applications wherein the sites are less spatially dispersed. Point of sale terminals in a store and sites in a high rise building are examples of such applications. A further limitation to this technology is that the central control sites and the transceiver sites served by the central control sites are but two layers of a hierarchical data collection system, and the central control sites must forward their gathered data to the next level of the hierarchy, typically by means of ground based twisted pair or coaxial cable communication links that hard wire each central control site to the next element in this hierarchical data collection system. It is therefore apparent that all of the elements in these existing data collection systems are not being utilized in their full capacity and severe economic penalties are incurred due to the architectural limitations inherent in the above-described configuration.

Radio transceivers in any particular application are typically located at a plurality of sites over a geographic area of significant extent. Controlling the operation of all of these transceivers in an orderly constrained manner can be a non-trivial task, especially where the topography interferes with the range of communication of each of these transceivers. The method and apparatus of the present invention converts a geographically dispersed collection of transceivers into an organized packet switched network with greater utilization of each transceiver and a significant reduction in the number of central control sites as well as the elimination of a substantial number of the ground-based communication links between central control sites and their hierarchically senior data collection elements. This is accomplished by the implementation of virtual waveguides that represent deterministic data communication highways through the plurality of radio transceivers to transmit data from various sources to identified destinations. In this system, any node can perform the functions of a gateway node to interconnect the network with an external communication link or data collection site.

System Architecture

Figure 1:
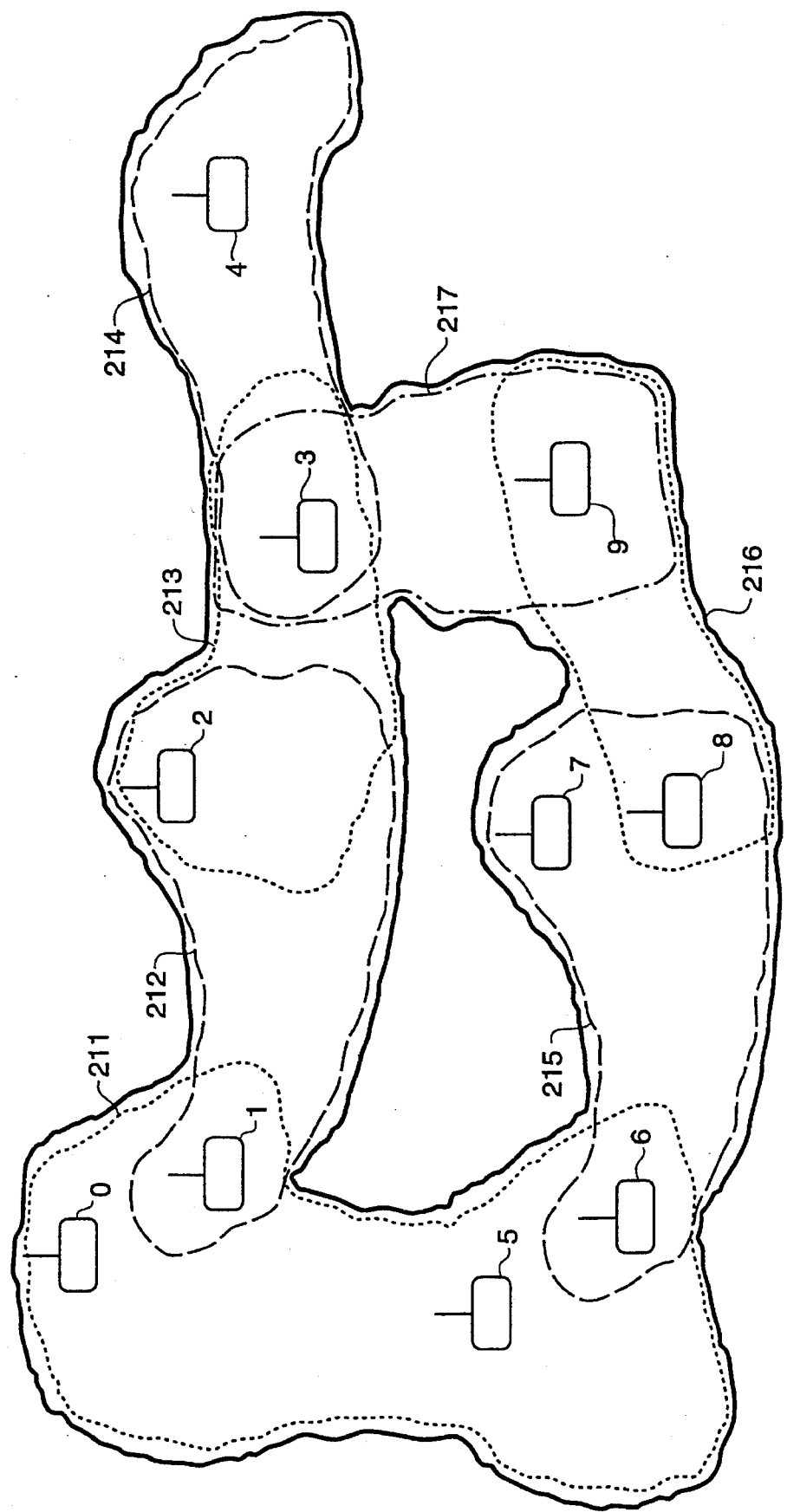
FIG. 1 illustrates in block diagram form the overall architecture of the wireless radio packet switched network, with a plurality of transceivers grouped into relay elements.

FIG. 1 illustrates the overall architecture of the packet switched network of the present invention. This network includes a plurality of transceiver elements 0–9, each of which is located at a predetermined site in a particular area that can be of significant geographic extent. These transceiver elements 0–9 are typically omnidirectional broadcast and receive radios (although they can be directional, depending on the application) operating in a remote polling mode, wherein they respond to an incoming broadcast message that identifies this particular transceiver site by a coded identification by generating a response that transmits a predetermined set of data back to the polling central control transceiver, to relay the information collected at this particular locus to the polling central control transceiver. In the prior art, a plurality of transceiver elements 0–9 is typically vectored on a single central control transceiver in order that this transceiver may seriatim collect data from the plurality of transceiver elements 0–9. The system of FIG. 1 differs from this traditional architecture in that the transceiver elements 0–9 illustrated in FIG. 1 do not directly vector on an associated polling central control transceiver. The central control transceivers described above are not illustrated in this figure and a typically large number of individual transceiver elements 0–9 are used to implement a network, ten of which transceiver elements are illustrated in FIG. 1. Each of the transceiver elements 0–9 can itself be a central control transceiver, collecting data from a plurality of site based transceivers (not shown). For simplicity of description, the ten transceiver elements 0–9 are used as the basic network that illustrates the concepts of this invention. The plurality of transceivers 0–9 is configured into a packet switched network and are not required (but could) to vector directly on a central control transceiver (not shown) since they can relay their requested data via other transceiver elements 0–9 to a designated destination.

Figure 2:
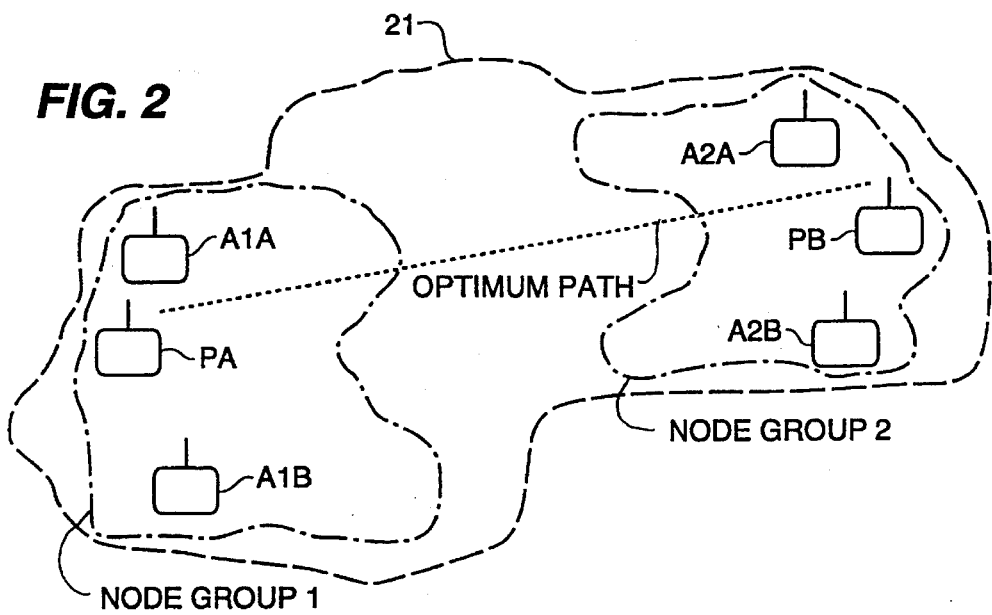
FIG. 2 illustrates the use of alternate propagation paths in the network.

A fundamental novel structure in this network is the relay element which is used in conjunction with the definition of a virtual waveguide to implement dedicated data communication paths through a collection of transceiver elements as shown in FIG. 2. A relay element 211–217 is an arbitrarily-shaped region or zone of propagation certainty in which the probability equals one that all radio transceiver nodes located in that region can communicate directly with one another. A relay element (ex 211) typically consists of a plurality of transceiver nodes 0, 1, 5, 6, and the certainty of transmission through the relay element 211 means that a transceiver node 0 at an entry point of the relay element 211 can relay the received message to a transceiver node 6 at a desired exit point of this relay element 211. Thus, the geographic region covered by the plurality of transceiver elements 0–9 is broken down into a plurality of relay elements 211–217 each of which includes a plurality of the transceiver elements 0–9 and covers a segment of this entire geographic area. A relay element 214 may include midpoint transceivers 3 that relay the messages from the transceiver elements at the exit 4 and entry 2 points, but this is not a necessary component of a relay element 211–217.

As shown in FIG. 2, at a minimum, the relay element 21 has a primary or optimum propagation path from the entry point PA to the exit point PB that is optimally connected in that the signal path therebetween is minimized for interference and the propagation is also being maximized for signal strength. Since these components are controlled or determined by the local topography, the network architect predetermines the primary path P as a function of the topographical features in this relay element region 21. Alternate propagation paths can also be selected in the event that a transceiver element PB in the primary path P is occupied or experiencing maintenance problems. While it has been described that each relay element contains a primary P and preferably alternate communication paths from an entry point PA to an exit point PB, it is also anticipated that there can be multiple entry points A1A, A1B and multiple exit points A2A, A2B for each relay element 211–217. There is the possibility of a plurality of primary communication paths or virtual waveguide segments through each relay element 21–24. In addition, an entry point can transmit a received signal to any one of a plurality of exit points in the relay elements. In this manner, the path through a relay element may be somewhat self-defining as will be defined in further detail below.

Another essential element of this packet switched network is formed by combining any number of relay elements in an arbitrary manner to form an end-to-end link that is called a virtual waveguide. A virtual waveguide defines the virtual packet relay boundaries as a packet is propagated from a source to the destination. The name virtual waveguide is selected because a packet is completely contained within the boundaries of the virtual waveguide that is defined and cannot propagate outside of its walls. This limitation is not necessarily a physical limitation, since the virtual waveguide can have relay elements which have logical or virtual propagation boundaries. The electromagnetic radiation emitted by a transceiver may propagate beyond the boundaries of a virtual waveguide, but is rejected at other transceiver elements by the network protocol (L2 or L3 layer, for example). The propagation paths through each relay element therefore represent a segment of the virtual waveguide between source and destination. By chaining together a plurality of the segments of the virtual waveguide in the form of concatenated propagation paths, an end-to-end predefined spatially and temporally limited communication path is established from the source to destination in a manner that obviates the need for extensive control circuitry or path definition algorithms that are commonly found in end-by-end networks. The simplicity of network control is obtained since the relay elements are well-defined and have preestablished propagation paths therethrough. Network management therefore is simply a matter of chaining together predefined path segments along preferential directions through the region along the predefined propagation paths of the relay elements. A packet communication protocol is used in conjunction with this network architecture to ensure absolute reliability, that is, the source node is informed whether or not the destination node has received the packet of information transmitted by the source node.

A virtual waveguide can also be described by parameters such as polarization of the signal, frequency, individual packet propagation delay and group delay for multi-packet messages. For most radio networks, the frequency and polarization of the transmitted signal is constant or fixed for all virtual waveguide. This constraint minimizes the intelligence required at each radio node, since any given radio node can be concurrently contained within separate relay elements and hence virtual waveguides. The node therefore does not have to switch between transmitter frequencies and antenna polarizations as it functions as a relay node in different virtual waveguides. This capability may become important as very high throughput networks are needed to solve complex communication problems. individual packet propagation delay can be defined as the summation of all relay element delays, which sum then defines the overall packet delay of a designated virtual waveguide. The individual relay element delays are not fixed and vary slightly from relay element to relay element and the delay for a given relay element can vary from packet to packet as individual nodes become congested or are unavailable for use. The group delay occurs when the message to be transmitted is larger than an individual packet and represents the time required from the start of the first packet of the message to the time when the final packet of the message is received at the destination node.

The transceiver elements described herein are described in the context of fixed site elements, but can also be mobile units which can interrogate the nearest fixed radio node in the network to obtain its virtual waveguide definition information. The mobile unit can then include itself in the network by using this virtual waveguide information to communicate directly with other nodes in the network, or can vector on the nearest site as an entry point into the network.

Radio Transceiver

Figure 7:
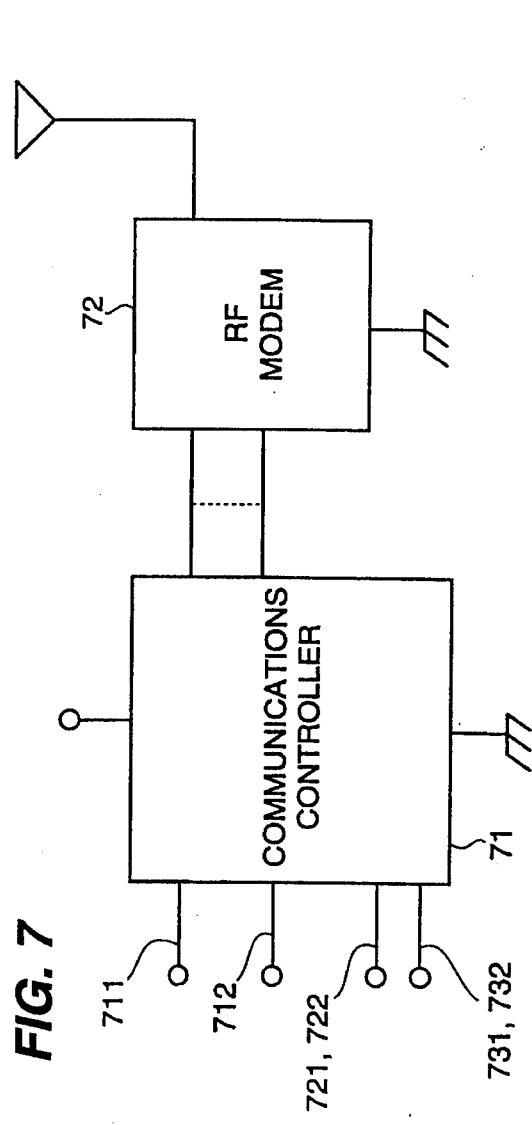
FIG. 7 illustrates in block diagram form the architecture of the radio telemetry transceiver.

FIG. 7 illustrates in block diagram form the architecture of a typical radio telemetry transceiver 7 that is presently in use in the field of radio telemetry. The radio telemetry transceiver 7 is comprised of two primary elements: communications controller 71, radio frequency modem 72. The communications controller 71 provides the intelligence that performs the protocol conversion, data formatting, network packet generation, and various other control functions. The radio frequency modem 72, also termed the radio frequency transceiver, is the radio element that communicates with other radio telemetry transceivers in the network and has limited intelligence. The radio telemetry transceivers can be spread spectrum elements or can use more traditional modulation techniques. Communications controller 71 performs the radio telemetry transceiver management function and regulates the operation of radio frequency modem 72. Communications controller 71 is typically designed to be independent of the specific characteristics (frequency of operation, data rate, modulation type, etc.) of the radio frequency modem 72 that is installed in radio telemetry transceiver 7, although the communications controller 71 typically manages and configures the radio frequency modem.

Communications controller 71, as illustrated in FIG. 7, is equipped with two RS-232 serial data ports 711, 712 that are used for hardware and software flow control. Two digital input ports 721, 722 and two digital output ports 731, 732 are also provided and are used for customer applications. The digital input ports 721, 722 and digital output ports 731, 732 can be TFL interfaces and optically isolated since the devices to which they are connected are typically exposed to a hostile ambient, in the form of noise, overvoltage signals, etc.

Radio frequency modem 72 can be a spread spectrum transceiver that is direct sequence in architecture. To minimize collisions with other signals on the network, the radio frequency modem 72 uses Carrier Sense Multiple access (CSMA) which is a listen before transmit scheme. The intelligence of radio frequency modem 72 is limited since it relies on communications controller 71 for packet formation/decoding and network control. Radio frequency modem 72 functions to frame packets, transmit packets to the network and receive packets from the network.

A typical implementation of radio frequency modem 72 is a transceiver that operates in the 902–928 MHz frequency band which is for use by relatively low power (such as 140 milliwatts), relatively low range (typically 25 miles), spread spectrum transmitter systems. These transmitters have the characteristic that the modulation techniques used therein spreads the energy of the transmitted signal over a very wide bandwidth. The spreading of the signal power in this fashion reduces the power density of the signal at any given frequency and thereby reduces the probability of interference with other transmitted signals. The communications controller 71 receives data from external sources (not shown) at data rates that can vary over the normal range of data transmission for modems, presently from 150 bps to 9600 bps. Communications controller 71 buffers the received data, packetizes the data and transmits it vis radio frequency modem 72 at a data rate of typically 121 kbps.

Figure 8:
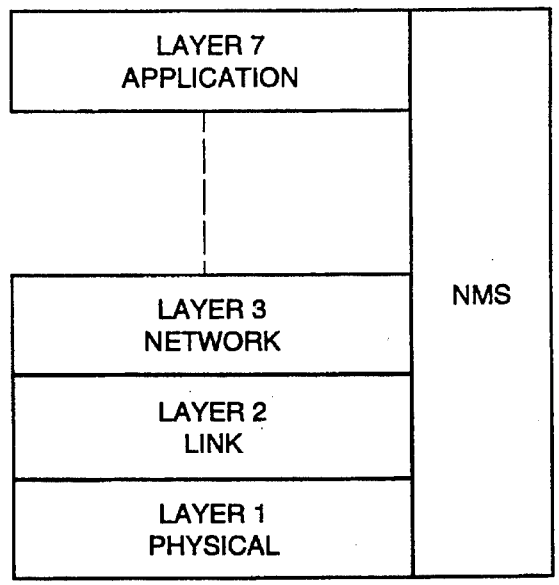
FIG. 8 illustrates in block diagram form the protocol architecture.

The software that controls the operation of the radio telemetry transmitter 7 is resident in communications controller 71 and illustrated in block diagram form in FIG. 8. This control software is substantially similar to the industry standard OSI 7 layer model. The control software implements levels 1, 2, 3, 7 of this protocol and the protocol stack is surrounded by a network management shell NMS. Layer 1 is the physical layer that provides application interconnection. Layer 2 is the control software that regulates the exchange of information between two individual nodes. Layer 3 software defines and controls the behavior of the network that interconnects the plurality of nodes. The layer 7 software represents custom or semi-custom software that implements a specific application of the radio telemetry transceiver 7. The layer 7 software is typically implemented at a digital input/output level to manage the flow of data between the packets of the network and the devices that are interconnected to the input ports 721, 722 and output ports 731, 732 of the communications controller 72. The layer 7 software can also modify or manage the customer application to include: protocol conversion, poll spoofing, address mapping.

Relay Element

The objective of a relay element is to provide an incremental link within the virtual waveguide to progressively forward a packet of information away from the source node and closer to the destination node. By definition, each node contained within a relay element can communicate with any other node within the relay node independent of its location within the relay element. Therefore, all of the transceiver nodes within a relay element must have unobstructed communication paths therebetween. The typical relay element is formed from nodes in the network that also service the application implemented at the site. It is obvious therefore that a relay element must be configured as a function of the native topography within the area covered by the relay element. It is expected that relay elements will have irregularly shaped boundaries and vary significantly in size even within a particular region of the network. A relay element must therefore have at least one transceiver node and more typically two transceiver nodes, one being an entry point to the relay element with the other transceiver node being an exit point of the relay node. For reliability purposes it is preferred that each primary node within a relay element have a corresponding alternate node that can replicate the function of the primary node in the event that the primary node fails to operate. The maximum number of nodes in a relay element is not a topological or topographical limitation, but rather it is a constraint on the virtual waveguide path size description. From a practical perspective, a finite limit is set on the path descriptor in order to constrain it to fit within a predetermined protocol. The size of this path descriptor therefore determines the number of possible nodes. Intelligence can be included in the source radio to only include the virtual waveguide table in the descriptor of length sufficient to reach the designated destination. Overhead can also be reduced by removing relay elements from the path descriptor as these relay elements are traversed by the message. This procedure progressively reduces the size of the overhead carried in the packet as the packet traverses the network.

The length between two primary nodes within a relay elements is defined as the optimum path within the relay element's boundary of propagation certainty. This optimum path is characterized by a number of variables and is first determined theoretically and can be fine tuned empirically. The variables that are considered are received signal strength, packet delay minimization, low relay node traffic congestion, best location within a relay element to communicate with all other nodes in the relay element and best location to be included within other virtual waveguides. The most significant of these variables is best location within a relay element to communicate with all other nodes contained within the relay element since conceptually this represents the path that best describes the midpoint of a region of propagation certainty. In configuring relay elements, it is expected that most of the transceiver nodes contained within a relay element are functioning in other applications, such as remote monitoring and remote control functions, but some transceiver nodes may be inserted simply to perform the packet network switching function for this relay element.

Virtual Waveguide

A virtual waveguide is comprised of at least one and typically multiple relay elements that form an end-to-end link between a packet source and a packet node. The definition of the virtual waveguide is located at the source node and, since every transceiver element in the network can be a source node, every transceiver element must have information regarding all of the virtual waveguides that are necessary to communicate with other nodes in the network. The network's virtual waveguide description is unique with respect to each individual transceiving element in the network. This means that for complete peer-to-peer connectivity, each individual transceiver must have its own set of unique virtual waveguide descriptions that denote how it is connected to the rest of the network. The set of virtual waveguides for each transceiver element is with respect to or relative to its position in the network topology. In other words, the connectivity is described from the source node as viewed looking into the network.

Packet Protocol

The packet that is transmitted through the network is comprised of information that enables absolutely reliable transmission from a source transceiver node to a destination transceiver node. The packets that are transmitted through the network must be self-defining in that they contain sufficient information in their protocol to enable every relay element that handles the packet to identify not only the source of the packet, but also the propagation path that must be taken through the relay element to propagate this packet closer to the destination node that is identified within the packet. It is important to provide a robust protocol that provides this self-defining path capability yet also represents a minimal overhead that is appended to the data that is transmitted to make the packet transmission efficient. The use of relay elements and virtual waveguides simplifies the path definition through the network and therefore correspondingly reduces the overhead required in the packet to route this message from the source node to the destination node. The packet protocol illustrated in FIG. 4 has four segments: Network header, virtual waveguide header, diagnostic header and data/command block. The purpose of the network header is to define networking behavior, network type, source and destination addresses, hop address, virtual waveguide concatenation, command/data packet and packet order within a given message. The virtual waveguide header describes a virtual waveguide description to include the number of node groups, node group position, address and type of nodes within a given node group. The diagnostic header contains information that describes the packet's actual path taken during propagation through the network from the source node to the destination node. The data/command block is the location in the packet where customer or network commands reside.

Network Header

The network header illustrated in FIG. 5 contains a number of informational items that are required for transmission of a packet through the network with absolute reliability. The Customer ID field can be used to differentiate among a plurality of customers who share a common network or overlapping networks. The H field contained within the network header describes the next destination hop address which is successively changed and inserted as the packet is relayed through the various relay elements. The hop address comes from the virtual waveguide description that is carried in the packet and is always the primary node first and alternate nodes later within each relay element. The N field within the packet header is the logical network descriptor which can define up to thirty two possible logical networks given its five bits of reserve size. The S field within the network header is the address of the source transceiver node and is used to return acknowledgements or negative acknowledgements from the destination node to indicate whether the packet that was transmitted by the source node was successfully received. The D-1 field in the packet header is the identification of the primary destination address for the packet and is typically a gateway node for the network or an application node. The destination node could also be a peer node. The D-2 field in the packet header is the address of the secondary destination for this packet and the decision to route the packet to the secondary destination is dependent on a number of factors relating to the operation and performance of the network. The selection of the alternate destination is performed dynamically within the network, and this secondary address is provided at the source node in the event that this alternate routing must be used within the network. The D sub-field in the packet header represents the sub-address of the destination node which is useful at gateway locations that require more than one node for redundancy or through-put requirements. Thus, the destination node can be specified with a finer degree of granularity by the use of this field in the packet header. The D-set field in the packet header is a one bit control field that indicates whether or not the destination node sub-addresses should be utilized if there is a failure at the initial destination node address. The DRD field in the packet header is used by the transceiver node adjacent to the destination node to define what action should be taken should the destination node be unavailable. These alternatives are: route to the alternate destination node; route to the alternate destination node and return a message to the source node indicating that the primary destination node was unavailable but the packet was forwarded to the alternate destination node specified in the packet header; terminate this packet and send a message to the source node indicating that the packet was unable to be delivered to the designated destination node; terminate the packet and do not send any indication to the source node regarding the failure to deliver this packet. These alternatives are all available, and the source node selects one of these possibilities upon origination of a particular packet. The next field in the network header is the port ID field which is used to identify which of multiple (typically two) ports (or both) is the designated destination port. The field L3-ack in the packet header indicates to the destination transceiver node whether or not the source node requires the transmission of an acknowledgement to the source node to indicate that the message was successfully received by the destination node. The L2-ack is another acknowledgement enable field that indicates whether acknowledgements should be returned on a point-to-point, node-to-node basis as the packet is propagated through the network. The new VWG field in the packet header is a virtual waveguide extension bit that enables a message to be sent further than the virtual waveguide definition capability of the packet. This bit when enabled tells the relay elements to strip off their address from the virtual waveguide path definition contained in the packet and append a waveguide segment at the end of the existing virtual waveguide description that would further carry this packet toward the defined destination. Therefore, as the packet is routed through the network, traversed links of the virtual waveguide are stripped off from the virtual waveguide description and new segments of path definition are added to the virtual waveguide definition as the packet traverses the network. Therefore, the network itself creates the virtual waveguide definition based on the identification of the destination node that is contained within the packet header. This enables the network to be piecewise looking forward toward the destination node and does not require the source node to completely specify the path segment by segment through the entirety of the network to reach the destination node. It is adequate to simply provide at least one and preferably several links into the network of a path definition and thence allow the relay elements themselves to define successive extents of the virtual waveguide through the network until the destination node identified in the packet header is reached. The VWG node address field used in the packet header is the identification of the node that is to update the virtual waveguide path description in the packet. Each node in the path compares its address to this address to determine whether it is the node that has been selected to extend the virtual waveguide path description contained within this header. It is recommended that the node selected to perform this function be a primary node since it is most likely to have the largest number of potential virtual waveguides emanating therefrom. This primary node itself can revise this field if it cannot in totality define the virtual waveguide all the way to the destination node. The selected node can simply extend this packet as far as possible through the network and then designate another primary node downstream to replicate the function that it performs in defining the next leg of this virtual waveguide to the destination node. The packet order field contained in the packet header is a message management field that tells the destination node how to reassemble a collection of packets in their correct order. Therefore, a message originated by a source node may contain a plurality of packets, and it is desirable to ensure that these packets, as received at the destination, are reordered in their proper sequence since the information contained within the packets may not be self-defining in terms of the order of presentation of these materials. Therefore, the packet order field is a sequence number that indicates the proper methodology to reassemble the plurality of packets into the proper informational order. The Packet priority field is used by the source node to indicate the urgency level appropriate to assign to the transmission of this packet. The packets can be flash, routine or background status, or other levels that may be assigned by the network administrator. The M bit in the packet header indicates whether this packet is part of a larger message or represents a stand-alone single packet message. The unique message identifier field of the packet header is a message stamp that is unique to this particular message to enable the network to distinguish between multiple messages from a given transceiver element. This field ensures that if the same message is sent out more than once by the source node that the two messages are not confused since each message has its own unique message identifier. Finally, the broadcast mode field indicates which broadcast mode is assigned to this packet. The packet can be single virtual waveguide broadcast, all virtual waveguide broadcast, or point to multipoint broadcast.

Virtual Waveguide Header

The virtual waveguide header describes the virtual boundaries of how a packet is relayed from the source node to the destination node. The virtual waveguide description is stored at the source node and is inserted into the packet when a transmit operation is initiated. With the exception of concatenating additional virtual waveguide segments as described above, the initial virtual waveguide definition is never modified by any successive element in the path. The size of the virtual waveguide header is arbitrarily limited to thirty-two nodes for packet efficiency purposes and can be distributed in any fashion as either primary, alternate one, alternate two and alternate three nodes to form multiple node groups. It is necessary at a minimum to have at least a primary node for each node group.

Message Flow in the Wireless Radio Packet Switching Network

Figure 9:
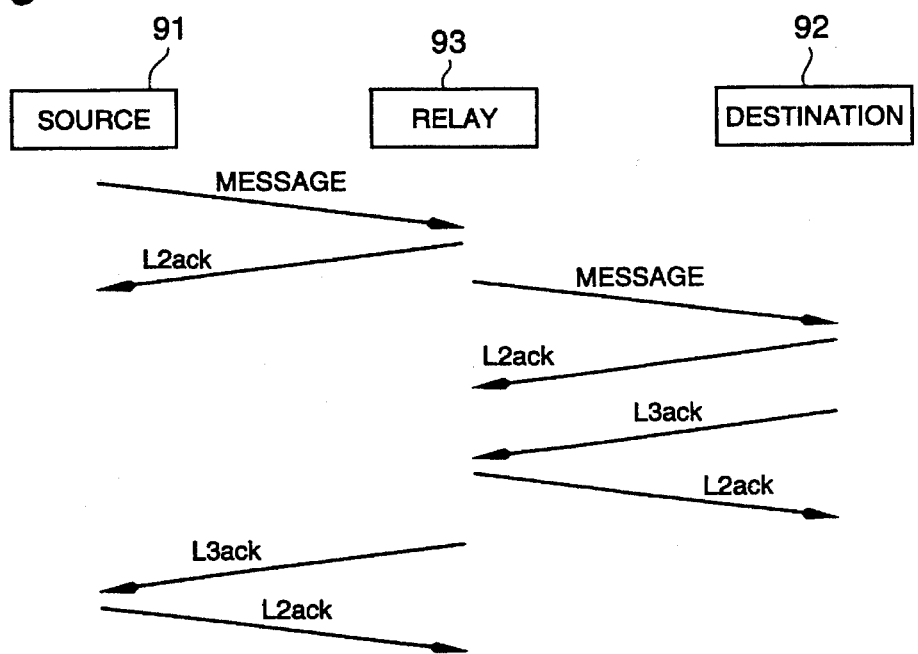
FIG. 9 illustrates the flow of messages through a simple two stage network.

The flow of messages in the wireless radio packet switching network is illustrated in the chart of FIG. 9. This diagram is simplified to illustrate the concept of the network and can be simply extrapolated to any network application. A source node 91 is illustrated as initiating a communication connection to a destination node 92 via a single relay node 93. A typical application can have many relay nodes and interleaved massaging among nodes, but the message flow diagram of FIG. 9 illustrates the initiation of a single message transmission from source node 91 to destination node 92. It is presumed that the source node 91 and destination node 92 are capable of communication and that a single message is transmitted in unidirectional fashion.

The message transmission is initiated by source node 91 initiating a message transmission to the network. Communications controller 71 collects the data to be transmitted to the destination node 92 and packetizes this data according to the control software that is resident in communications controller 71. The communications controller 71 initiates a radio broadcast to the network by activating radio frequency modem 72, which monitors the channel to determine whether any other node in radio transmission range of the source node 91 presently has a transmission extant on the allocated radio frequency. If not, radio frequency modem 72 seizes the channel and initiates a radio frequency transmission (Message) of the packets that have been formulated by communications controller 71. The message transmitted by radio frequency modem 72 of source node 91 is received by the corresponding radio frequency modem of relay node 93. The received message is passed by the radio frequency modem of the relay node 93 to its communications controller for interpretation. The communications controller in relay node 93 performs an error check routine on the received message to ensure that it has been received error free. If no transmission errors are detected by the communications controller in relay node 93, the communications controller produces an acknowledgement signal for transmission to the source node 91 to indicate that the initiated message was received by the intermediary, relay node 93. This acknowledgement message is a layer 2 acknowledgement (L2 Ack) signal which the communications controller of relay node 93 activates the radio frequency modem to transmit to the source node 91. The radio frequency modem of the relay node 93 monitors the channel to determine whether any other node in radio transmission range of the relay node 93 presently has a transmission extant on the allocated radio frequency. If not, radio frequency modem of the relay node 93 seizes the channel and initiates a radio frequency transmission of the L2 Ack packet that has been formulated by the communications controller of the relay node 93. The message transmitted by radio frequency modem of relay node 93 is received by the corresponding radio frequency modem of source node 91. The received message is passed by the radio frequency modem 72 of the source node 91 to its communications controller 71 for interpretation. The communications controller 71 in source node 91 performs an error check routine on the received message to ensure that it has been received error free. If no transmission errors are detected by the communications controller 71 in source node 91, the communications controller 71 decodes the received packet and since it is an L2 Ack message, does not initiate any further response but simply notes that the transmitted message is being forwarded through the network toward the destination node 92.

Since the message (Message) transmitted by source node 91 to relay node 93 is one that is not destined for relay node 93, but is to be forwarded to destination node 92, relay node 93 retransmits the received message on the network toward the destination node 92. This is accomplished using the process described above, with relay node 93 initiating a message transmission to destination node 92 and receiving an L2 Ack message from destination node 92 in response. Since the destination node is the final repository for the message, it initiates a message to source node 91 to indicate that the network has successfully passes the originated message to its intended destination. This message receipt confirmation is a level 3 acknowledgement message L3 Ack which is originated by destination node 92 into the network using the message initiation process described above. The L3 Ack message is received by relay node 93, which initiates a response (L2 Ack) to destination node 92 to acknowledge receipt of the message initiated by destination node 92. The L3 Ack message is forwarded by relay node 93 to source node 91 using the communications procedure described above, with an exchange of L3 Ack and L2 Ack messages. This exchange of messages and acknowledgements is regulated by timers and retry counters to ensure that confirmation of message transmission is received in a reasonable time after transmission. Failure of an appropriate response to be received, causes the message to be retransmitted by the last node that successfully forwarded the message along the designated path throughout the network.

Broadcast Messages

The architecture of the wireless radio packet switching network lends itself to the use of various types of broadcast messages. The virtual waveguide broadcast message represents a message that is destined for all nodes that are located within the confines of a defined virtual waveguide. The virtual waveguide broadcast message is initiated by a node within the defined virtual waveguide initiating a message transmission with the virtual waveguide broadcast bit set. As each node in the virtual waveguide receives the broadcast message, the communications controller in the node examines the received message and in response to the set virtual waveguide bit, passes the received information to the customer port and initiates a rebroadcast of the received message to the next relay element in the virtual waveguide. Since each relay element in the virtual waveguide comprises a set of nodes having propagation certainty, it is ensured that all nodes in the defined virtual waveguide receive the broadcast message.

Similarly, a network broadcast message can be used to communicate a message to every node in the entire radio network. This process is realized by the progressive launch of virtual waveguide messages into the network. The set of virtual waveguide messages that are successively initiated represent the set of all nodes in the network. The network broadcast message process assumes that the originating node, such as a gateway node, has sufficient knowledge of the network structure to communicate with all nodes in the network. The network broadcast message is initiated by the receipt of a message by a communications controller at one of the nodes in the network with associated data indicating that the message is to be broadcast network-wide. The communications controller at this node retrieves network architecture data from its memory to identify a set of virtual waveguide definitions that represents complete coverage of the network. The communications controller initiates virtual waveguide broadcast messages as described above, seriatim for each virtual waveguide defined in the retrieved set of virtual waveguides.

Furthermore, a point to multipoint broadcast message can be implemented in the network. The point to multipoint broadcast message is characterized by a single hop topology, where all multipoint nodes are within propagation certainty of the single point source node. A point to multipoint broadcast uses a special, unique and reserved destination address that all nodes in the network recognize as being included in a point to multipoint broadcast message. All nodes then forward the payloaded data to the user port on the communications controller. This topology typically disables the L2 and L3 Acks to reduce network traffic congestion in the point to multipoint direction. However, the reverse direction multipoint to point messages use a virtual waveguide path (single hop) which has the L2 Ack enabled. This is a valid topology and has greater reliability that traditional broadcast methods, with typically only one of the multipoint nodes responding to the point to multipoint node broadcast.

For either virtual waveguide or network broadcast messages, the communications controller at the initiating node can disable the message acknowledgement process to reduce the amount of communication traffic on the network. Since these messages are destined for many sources, the acknowledgement message traffic is significantly greater than for a simple end to end message transmission. Therefore, disabling the acknowledgement process can have a significant impact on network performance.

I claim:

1. In a radio based packet switched communications network comprising a plurality of radio transceivers, each of which is located at a predetermined site in an area of defined extent, a method of establishing a transmission path through said network, comprising the steps of:

configuring said plurality of radio transceivers into at least two relay elements, each relay element comprising at least two of said plurality of radio transceivers and covering a predetermined sector of said area of defined extent through which messages are transmitted with propagation certainty, with at least one of said radio transceivers in said relay element being a gateway radio transceiver for exchanging data packets with other of such gateway radio transceivers in other relay elements; and defining a virtual waveguide of limited spatial extent through said network to forward a data packet received at a first radio transceiver in a one of said relay elements and forwarded through said sector covered by said relay element to a gateway radio transceiver in said one relay element to a destination radio transceiver in said network via said virtual waveguide which comprises a predefined succession of ones of said plurality of radio transceivers that are cooperatively operative to transmit a data packet received from a radio transceiver last prior in said succession to a radio transceiver next in said succession from said gateway radio transceiver in said one relay element to said destination radio transceiver in said network.

2. The method of claim 1 further comprising the steps of:

generating in a packet originating one of said plurality of radio transceivers, a said data packet having a predefined protocol comprising:

identifying a one of said plurality of radio transceivers as a destination radio transceiver, and storing data for transmission to said destination radio transceiver.

3. The method of claim 2 wherein said step of generating further comprises:

storing data indicative of a topology of said network as viewed from said packet originating radio transceiver, extracting data from said stored data that defines a path through said network from said packet originating radio transceiver to said destination radio transceiver, and inserting said extracted data into said predefined protocol of said generated data packet.

4. The method of claim 3 wherein said step of extracting extracts data indicative of a series of topologically overlapping relay elements that collectively comprise a topological path from said packet originating radio transceiver to said destination radio transceiver.

5. The method of claim 3 wherein said step of storing stores data indicative of topological extents of each of said relay elements in said network, including topological overlaps between topologically adjacent relay elements.

6. The method of claim 3 wherein said step of generating further comprises:

extracting additional data from said stored data that defines an alternate path through said network from said packet originating radio transceiver to said destination radio transceiver, and inserting said extracted additional data into said predefined protocol of said generated data packet.

7. The method of claim 3 wherein said step of generating further comprises:

designating a one of said relay elements listed in said extracted data that is enabled to rewrite said extracted data to define an extension of said path described by said extracted data, and inserting data indicative of said designated relay element in said predefined protocol of said generated data packet.

8. The method of claim 7 further comprising the step of:

extracting in said designated relay element and responsive to the presence of said data indicative of said designated relay element in said predefined protocol of said generated data packet when said generated data packet is received by said designated relay element, data from said stored data that defines a path through said network from said designated radio transceiver to said destination radio transceiver, and inserting said extracted data into said predefined protocol of said generated data packet received by said designated relay element.

9. The method of claim 2 wherein multiple customers concurrently transmit data packets through said network, said step of generating further comprises:

inserting data indicative of a customer identification into said predefined protocol of said generated data packet.

10. The method of claim 2 wherein said step of generating further comprises:

inserting data indicative of a packet transmission priority into said predefined protocol of said generated data packet.

11. The method of claim 1 further comprising the step of:

interconnecting said network via a network gateway transceiver to communication apparatus external to said network.

12. The method of claim 11 further comprising the step of:

providing an alternate interconnection of said network via an alternate network gateway transceiver to said communication apparatus external to said network.

13. The method of claim 1 wherein a number of said radio transceivers perform communication functions in addition to network communication functions.

14. The method of claim 1 wherein said step of virtual waveguide defining comprises:

defining, in each of said gateway radio transceivers, a series of said at least two radio transceivers that constitute a path through said relay element from a first gateway radio transceiver to a second gateway radio transceiver that is located topologically closer to said destination radio transceiver than said first gateway radio transceiver along said defined path.

15. The method of claim 14 wherein said step of virtual waveguide defining further comprises:

inserting, in response to receipt of said generated data packet, data indicative of said defined series of said at least two radio transceivers that constitute a path through said relay element into said predefined protocol of said generated data packet.

16. The method of claim 1 further comprising the step of;

generating, in a packet originating one of said plurality of radio transceivers, identifying more than two of said plurality of radio transceivers as destination radio transceivers, and storing data for transmission to said destination radio transceivers.

17. In a radio based packet switched communications network comprising a plurality of radio transceivers, each of which is located at a predetermined site in an area of defined extent, a method of establishing a transmission path through said network, comprising the steps of:

configuring said plurality of radio transceivers into at least two relay elements, each relay element comprising at least two of said plurality of radio transceivers and covering a predetermined sector of said area of defined extent through which messages are transmitted with propagation certainty, with at least one of said radio transceivers in said relay element being a gateway radio transceiver for exchanging data packets with other of such gateway radio transceivers in other relay elements, comprising the steps of:

defining, a virtual waveguide of limited spatial extent through said network to forward a data packet received at a first radio transceiver in a one of said relay elements and forwarded through said sector covered by said relay element to a gateway radio transceiver in said one relay element to a destination radio transceiver in said network via said virtual waveguide which comprises a predefined succession of ones of said plurality of radio transceivers that are cooperatively operative to transmit a data packet received from a radio transceiver last prior in said succession to a radio transceiver next in said succession from said gateway radio transceiver in said one relay element to said destination radio transceiver in said network;

interconnecting said network via a network gateway transceiver to communication apparatus external to said network; and generating, in a packet originating one of said plurality of radio transceivers, a said data packet having a predefined protocol comprising:

identifying said network gateway as a destination radio transceiver, and storing data for transmission to said network gateway.

18. The method of claim 17 wherein said step of generating further comprises:

storing data indicative of a topology of said network as viewed from said packet originating radio transceiver, extracting data from said stored data that defines a path through said network from said packet originating radio transceiver to said network gateway, and inserting said extracted data into said predefined protocol of said generated data packet.

19. The method of claim 18 wherein said step of extracting extracts data indicative of a series of topologically overlapping relay elements that collectively comprise a topological path from said packet originating radio transceiver to said network gateway.

20. The method of claim 18 wherein said step of storing stores data indicative of topological extents of each of said relay elements in said network, including topological overlaps between topologically adjacent relay elements.

21. The method of claim 18 wherein said step of generating further comprises:

extracting additional data from said stored data that defines an alternate path through said network from said packet originating radio transceiver to said network gateway, and inserting said extracted additional data into said predefined protocol of said generated data packet.

22. The method of claim 18 wherein said step of generating further comprises:

designating a one of said relay elements listed in said extracted data that is enabled to rewrite said extracted data to define an extension of said path described by said extracted data, and inserting data indicative of said designated relay element in said predefined protocol of said generated data packet.

23. The method of claim 22 further comprising the step of:

extracting, in said designated relay element and responsive to the presence of said data indicative of said designated relay element in said predefined protocol of said generated data packet when said generated data packet is received by said designated relay element, data from said stored data that defines a path through said network from said designated radio transceiver to said network gateway means, and inserting said extracted data into said predefined protocol of said generated data packet received by said designated relay element.

24. The method of claim 23 further comprising the step of:

providing an alternate interconnection of said network via an alternate network gateway transceiver to said communication apparatus external to said network.

25. The method of claim 18 wherein multiple customers concurrently transmit data packets through said network, said step of generating further comprises:

inserting data indicative of a customer identification into said predefined protocol of said generated data packet.

26. The method of claim 18 wherein said generating further comprises:

inserting data indicative of a packet transmission priority into said predefined protocol of said generated data packet.

27. The method of claim 17 wherein said step of virtual waveguide defining comprises:

defining, in each of said gateway radio transceivers, a series of said at least two radio transceivers that constitute a path through said relay element from a first gateway radio transceiver to a second gateway radio transceiver that is located topologically closer to said destination radio transceiver than said first gateway radio transceiver along said defined path.

28. The method of claim 27 wherein said step of virtual waveguide defining further comprises:

inserting, in response to receipt of said generated data packet, data indicative of said defined series of said at least two radio transceivers that constitute a path through said relay element into said predefined protocol of said generated data packet.

29. The method of claim 17 further comprising the step of:

generating, in a packet originating one of said plurality of radio transceivers, a said data packet having a predefined protocol comprising:

identifying more than two of said plurality of radio transceivers as destination radio transceivers, and storing data for transmission to said destination radio transceivers.

* * * * *